United States Patent Office 2,975,620
Patented Mar. 21, 1961

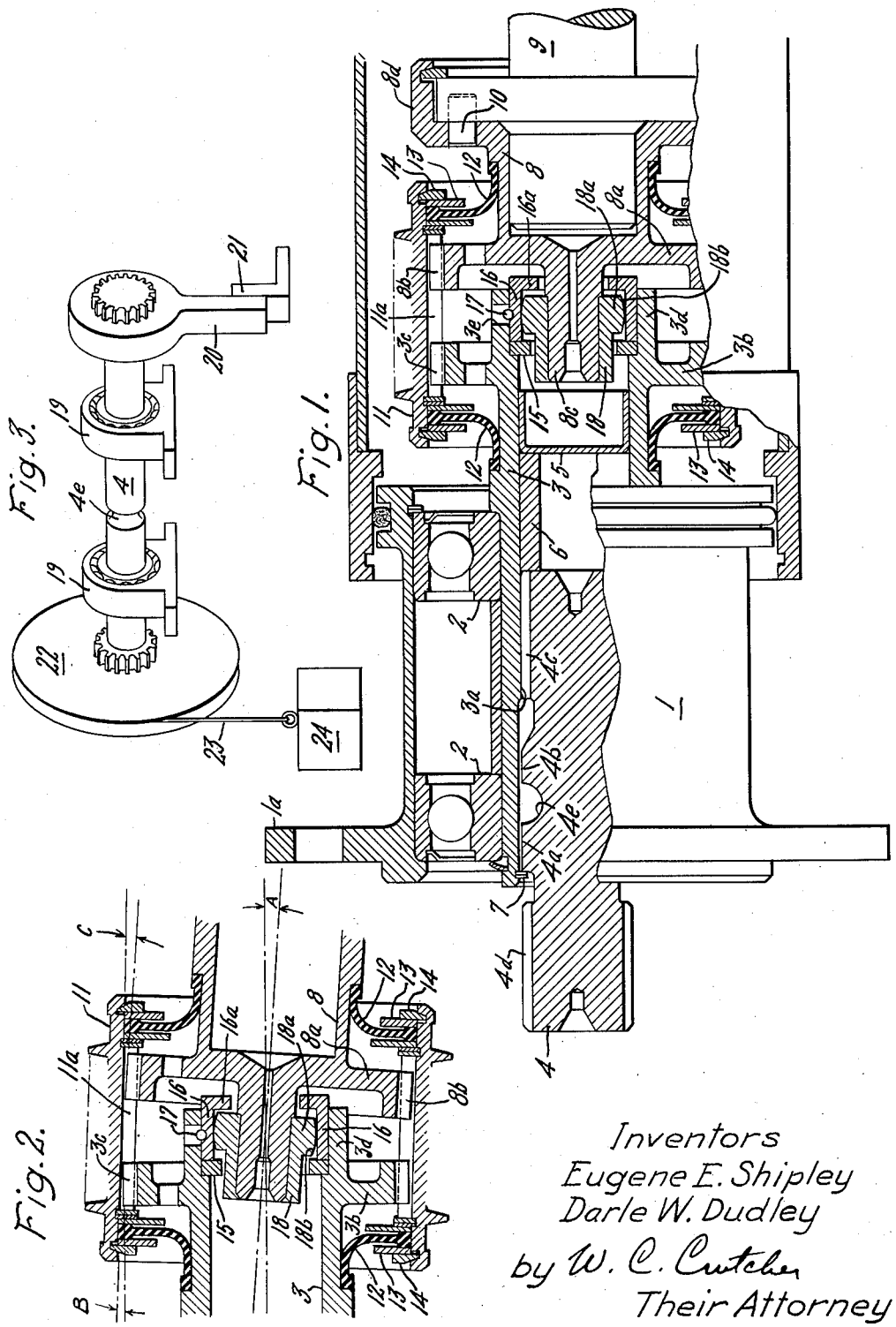

2,975,620

FLEXIBLE COUPLING WITH TORQUE-LIMITING MEANS

Eugene E. Shipley, Middleton, and Darle W. Dudley, Lynnfield, Mass., assignors to General Electric Company, a corporation of New York Filed Dec. 28, 1959, Ser. No. 862,112

5 Claims. (Cl. 64—9)

This invention relates to an improved flexible coupling for transmitting torque between two shafts which may become angularly or radially misaligned with respect to one another and incorporating special means therein to precisely limit the torque so that the coupling will fail within a very narrow predetermined torque range.

Whenever it is necessary to transmit torque between the driving and the driven shaft which are subject to angular or radial misalignment in operation, a flexible coupling is employed. Where the driving and driven shafts are so located having their terminating end portions at a substantial axial distance from one another, an intermediate shaft is employed to transmit torque between the separated shafts and it generally has a flexible joint both at its connection with the driving and with the driven shaft. While not limited in its application thereto, this invention is concerned with an improved flexible coupling for such a joint and includes means to reduce the stresses therein and incorporates as a portion thereof special means to cause the coupling to fail to prevent damage to the driving shaft within a very narrow range of predetermined loads on the shafts.

It is, of course, understood that if the separated driving and driven shafts become radially misaligned, a lengthening of the axial spacing between shafts will occur. If neither the driving nor driven shafts are arranged for axial movement, this will impose an additional tensile force on either the intermediate, driving, or driven shafts.

Conversely, if the driving and driven shafts are slightly radially displaced at the initial alignment and they move more into axial concentricity during operation, the spacing between shafts will shorten and if special provision is not included, a compressive stress will be introduced along the driving, driven, and intermediate shafts.

A familiar expedient for preventing the damage of torque transmitting members is the use of a "necked" portion of reduced diameter on one of the rotating members which fails in shear at the cross-section of the reduced diameter when the shaft is subjected to torque above a given amount. The precise point at which the "necked" portion can be expected to shear can be calculated theoretically, but very rarely will it shear at this point, since other factors also enter in. Specifically, there is some variation in the uniformity of the material. This can be reduced by metallurgical quality control. The hardness of the shear section has a very definite effect upon the point at which it will shear and this can be controlled somewhat by careful heat treatment and subsequent hardness measurements.

It is much more difficult to know the precise type of loading which will be present at the time of failure, since very rarely does failure occur in pure torsion, and axial stresses or bending moments on the shaft at the same time will give rise to a combined stress. The uncertainty of the type of loading thus gives a range or "spread" within which the "necked" portion may be expected to fail if certain conditions are assumed, and then the coupling must operate at a torque below the lower limit of this range of values. Naturally, the range within which the torque-limiting means will fail must be narrowed in order that the permissible torque on the driving shaft and the torque-transmitting ability of the coupling will lie as close to one another as possible in order to permit the use of the smallest lightest-weight coupling achievable.

An additional factor which may give rise to rather unpredictable transient stresses along the shaft members, perhaps causing premature failure of the shear member, is the type of connection provided for transmitting torque at the joint between the intermediate shaft and either the driving or the driven shaft. Where internal and external spline teeth are employed, the teeth naturally become misaligned with one another. The more the misalignment between teeth, the more likelihood there is of transient or excessive stresses being introduced due to improper meshing of the tooth surfaces. Some assistance can be had in this respect by centering or "piloting" so that one shaft pivots about a point on the axis of the other shaft located under the meshing internal and external spline teeth so that the teeth are held coaxial with one another. One such arrangement is shown in U.S. Patent No. 2,778,565, issued to R.P. Atkinson on January 22, 1957, and assigned on its face to General Motors Corporation. This patent shows a coupling with universal joints connecting an intermediate shaft at either end with a spaced driving and driven shaft. Each joint includes a coupling sleeve having internal spline teeth meshing with external spline teeth on the ends of the intermediate shaft and on the driving and driven shafts. With Atkinson's arrangement, however, the full angular spline tooth misalignment takes place in one set of internal and external spline teeth at each joint. Hence the stress introduced at each coupling joint due to spline tooth misalignment is produced by only one set of spline teeth.

Also in the Atkinson patent, the intermediate shaft may not move axially, but transmits thrust between the universal pivot connections.

Accordingly, one object of the present invention is to provide an improved flexible coupling having a component designed to fail within a very narrow range of predetermined torque on the coupling without damaging the vital components of the coupling.

Another object of the invention is to provide an improved flexible coupling joint for connecting an intermediate shaft at its ends with relatively widely spaced driving and driven shafts while minimizing excessive or transient stresses due to spline tooth misalignment at the connections.

Another object of the invention is to provide an improved lubricated piloting connection or centering connection for positioning two splined shafts with respect to a coupling sleeve while allowing slight axial movement between shafts.

Another object is to reduce the stresses in the coupling due to misalignment of the spline teeth between two angularly misaligned externally splined shaft members and an internally splined coupling sleeve member.

Another object is to reduce the contributive factors of coupling misalignment on a torque-limiting device contained in the coupling.

Another object is to provide an improved method for narrowing the range of predicted failure in shear of a torsion member.

Still another object of the invention is to reduce the possibility of failure of a torsion member designed to fail in torsion alone due to extraneous stresses introduced by a closely adjacent coupling.

The subject matter which is regarded as the invention is particularly pointed out and distinctly claimed in the concluding portion of the specification. My invention, however, both as to organization and method of practice, together with further objects and advantages thereof, may best be understood by reference to the following description taken in connection with the accompanying drawing in which:

Fig. 1 is an elevation drawing, partly in section, showing the flexible coupling for connecting a driving shaft and an intermediate shaft;

Fig. 2 is an enlarged detail view of the special axially slidable piloting means showing its location between spline teeth, the spline teeth being shown in a condition of angular shaft misalignment; and Fig. 3 is a perspective view illustrating one step in the method of producing the special torque-limiting means of the flexible coupling.

Generally stated, the invention is practiced by providing a piloting means substantially midway between two externally splined members to halve the tooth misalignment with an internally splined coupling sleeve, the piloting means being axially movable to permit shortening between shaft centers, thus also reducing the transient stresses transmitted axially along the shaft members. The coupling incorporates a quill shaft with a "necked" portion subjected to a "pre-yielding" process which further narrows the range of expected failure while operating in connection with the coupling.

Referring now to Fig. 1 of the drawing, the input end of the coupling is mounted for rotation in a cylindrical support member 1 having a mounting flange 1a arranged to be bolted to the structure supporting a driving shaft (not shown). Bearings 2 in the bore of the stationary cylindrical member 1 rotatably support a first coupling member 3 which is a hollow cylindrical member having internal spline teeth 3a and also having a circumferential radially extending flange 3b bearing external spline teeth 3c thereon. An axially extending hollow cylindrical portion 3d is disposed on coupling member 3 beyond the flange 3b.

Concentrically disposed inside coupling member 3 is a torque-limiting quill shaft 4. Quill shaft 4 is furnished with portions 4a, 4b maintaining close clearances with the bore of coupling member 3 so as to maintain it concentric therewith and is connected to coupling member 3 by external spline teeth 4c mating with spline teeth 3a to couple members 3 and 4 together. Quill shaft 4 is axially located inside coupling member 3 by a cup-shaped plug 5 secured to the bore of coupling member 3 with a suitable resin adhesive, a spacer piece 6, and a snap ring 7 at the other end abutting the radial surface of portion 4a. The exposed end of quill shaft 4 is equipped with spline teeth 4d for connection to the driving shaft (not shown).

Quill shaft 4 has a "necked" portion 4e which is designed to fail in shear at a predetermined torque. Thus the coupled members 3 and 4 turn as a unit, but only the quill shaft 4 need be replaced if fracture occurs. The treatment of the "necked" portion 4e will be detailed at length at a later point in the specification.

A second coupling member 8 comprises the driven portion of the coupling and includes a circumferential radially extending flange 8a having spline teeth 8b on the periphery thereof and an axially extending stub 8c which extends into cylindrical portion 3d of member 3. The second coupling member 8 also includes a spigot flange 8d drivingly connected to an intermediate shaft 9 by circumferentially spaced pins 10. Intermediate shaft 9 may serve as a connecting shaft between the driving shaft and an axially spaced driven shaft and may be connected to this driven shaft by a flexible coupling similar to the one shown in Fig. 1.

Torque transmission between the coupling flanges 3b, 8a through the respective spline teeth 3c, 8b is furnished by coupling sleeve 11 having internal spline teeth 11a. Coupling sleeve 11 is located only by its spline teeth 11a interacting with coupling member spline teeth 3c, 8b. It will be understood that enough radial clearance is provided between the external spline teeth 3c, 8b and the internal spline teeth 11a to allow angular misalignment between coupling members 3 and 8 to take place while still transmitting torque through the coupling sleeve 11.

In order to seal the torque transmitting assembly to prevent the escape of lubricant, flexible boots 12 tightly fitting on the peripheries of coupling members 3, 8 are held in position on the coupling sleeve 11 between suitable shims 13 and retaining rings 14. Boots 12 complete an enclosure surrounding the torque transmitting members.

Disposed in the bore of coupling member 3 and secured thereto by a suitable resin adhesive is a washer 15 and a centering cylinder 16 having a radial flange 16a. To further secure centering cylinder 16 to coupling member 3, a locking wire 17 passes circumferentially through grooves in both members and the ends are locked as by twisting together in the space afforded by slot 3e. Washer 15 and centering cylinder 16 together form an annular enclosure of a "U-shaped" cross-section which is located midway between the splined coupling flanges 3b 8a.

Disposed on the axially extending stub 8c and secured thereto by a suitable adhesive, is a piloting member 18 having a radial circumferential flange 18a extending toward the inner wall of centering cylinder 16. Flange 18a defines an arcuate surface 18b which is that of a partial sphere having its center located on the axis of coupling member 8. It is of particular importance to note that the axial length of the flange 18a of centering member 18 is less than the axial spacing between washer 15 and the radial flange 16a of the centering cylinder. It will be thus apparent that piloting member 18 can move axially within the enclosure to an extent permitted by this difference in axial dimensions and at the same time, coupling members 3, 8 may pivot about the center of curvature of surface 18b.

It is also of particular importance to note that the point of closest clearance between spherical surface 18b and the inner wall of cylindrical member 16 (when the centering member 17 is in its axially intermediate position) is precisely half way between spline teeth 3c and spline teeth 8b. Although axial movement of centering member 18 within the enclosure of centering cylinder 16 will, to some extent, slightly impair this relationship by placing the contact or pivot point slightly more or less than half way between spline teeth 3c, 8b, it will be understood that the net effect of the arrangement is to locate this pivot point substantially midway between the spline teeth of the two coupling members.

Reference to Fig. 2 of the drawing will show an enlarged detail view of the pivoting action of the flexible coupling when it is misaligned. The degree of misalignment between coupling members 3, 8 is designated here by an angle "A" between shaft axes which may be, for example, on the order of 4°. It will be seen that the centerlines of coupling members 3, 8 intersect at the center of curvature of spherical surface 18b. By virtue of the fact that this intersecting point is midway between spline teeth 3c and spline teeth 8b, the angles with which the spline teeth 3c, 8b mate with internal spline teeth 11a, these angles being represented by "B" and "C" respectively, are each only half as much as angle "A," for example only 2°. Although angles "B" and "C" may vary somewhat as centering member 18 slides within its limits inside centering cylinder 16, angles "B" and "C" will be substantially only half of angle "A." It will be noted that coupling sleeve 11 readjusts its position automatically since it is located by the respective spline teeth 3c, 8b.

The torque is thus transmitted from the driving quill shaft 4 through coupling member 3, coupling sleeve 11, coupling member 8, to the driven shaft 9. Transient additional torsional stresses which may be induced by angular misalignment of the coupling members are greatly reduced through the feature of "splitting" the angular misalignment between two sets of meshing spline teeth.

To further reduce extraneous effects which could cause a widespread range of torques at which the torque-limiting means of the flexible coupling will fail, the quill shaft 4 is made in the following manner. Very precise control is exercised over the "necked" portion 4e of quill shaft 4 to insure that the hardness of the quill shaft in this location versus the minimum diameter of portion 4e is correct to give a very narrow range of expected shearing torque when quill shaft 4 is in torsion.

First, the groove 4e is cut to its approximate dimension, terminating the machining at a slightly larger diameter than the expected finished diameter of groove 4e. This diameter may be on the order of .45 inch where the finished diameter is expected to range between .402 and .447 inch, depending on the hardness. Then spline shaft 4 is heat-treated to achieve a controllable hardness range. The exact hardness is difficult to control, but after heat-treating, the actual hardness achieved during the heat treatment is ascertained, by well known measuring techniques. Then, in accordance with a previously derived schedule of hardnesses versus diameters, additional material is carefully removed from groove 4e to arrive at a desired diameter correlated with the actual hardness of the spline shaft in the vicinity of groove 4e for a desired torque. This previously derived schedule is obtained by testing numerous samples and obtaining a correlation curve between the hardness and the groove diameter at the desired shearing torque. By way of example, the following table is illustrative of specimens which sheared at 2015 inch pounds of torque.

| Diameter: | Hardness (Rockwell C) |
|---|---|
| .446 to .447 | 28 |
| .442 to .443 | 29 |
| .438 to .439 | 30 |
| .434 to .435 | 31 |
| .430 to .431 | 32 |

Using this schedule or one similar thereto for a given desired shearing torque, additional material is removed from the groove to make the diameter correspond to that indicated for the actual hardness of the particular piece.

Referring now to Fig. 3 of the drawing, a diagrammatic illustration is shown of quill shaft 4 rotatably supported in bearings 19. One end of quill shaft 4 is held against rotation by suitable means shown diagrammatically as a dog 20 abutting a stationary stop 21. Means to apply a constant torque to the other end of quill shaft 4 is illustrated diagrammatically as a wheel 22 having a flexible cable 23 passing over its rim with a weight 24 suspended therefrom. The apparatus illustrated in Fig. 3 is merely a diagrammatic representation of a device for "pre-yielding" the portion 4e of quill shaft 4.

Principles of elementary strength of materials teach us that a body subjected to a load will yield or undergo plastic deformation before it actually ruptures. It is understood that the discussion here is limited to materials which have a stress-strain relationship roughly corresponding to that of the ferrous materials (excluding cast structures where the material may fracture before undergoing appreciable yielding). Torsion tests on specimens similar to the quill shaft 4 have indicated that the section 4e will yield before it ruptures to the extent that portions 4a, 4b are displaced angularly with respect to one another as much as 20 to 40 degrees before fracture takes place. Where the design load is very close to the theoretical calculated shearing load, some plastic deformation or yielding may take place in the groove 4e without rupture, particularly where the load is fluctuating or where momentary peak loads closely approach the designed breaking point. Where such partial yielding takes place under load without the member actually shearing, uncertainties or variables may be introduced which later affect the designed rupture torque as follows. At the moment of yielding, the metal in section 4e is in a plastic state. At this moment, the forces on the quill shaft are uncertain since there may be minor bending moments or minor axial forces which, when acting on the limber pliable metal of 4e in its plastic state will destroy the concentricity of quill shaft 4. When the imposed load is later reduced and section 4e becomes rigid, it may "wobble" causing the section to fail shortly in fatigue.

To reduce this possible extraneous factor, the apparatus of Fig. 3 is used to cause section 4e to yield under pure torsion and under controlled conditions thus preserving its concentricity when it yields. The means used here comprises a constant torque represented by the weight 23, but with some materials, a variable torque may be desirable, which could be supplied by a suitable hydraulic device.

Those familiar with stress-strain diagrams will recognize that if the constant torque applied is very slightly above the yield point, the material will yield slightly and then develop further resistance to the torque, the yielding section having undergone permanent deformation when the yield point is exceeded. Thus the applied constant torque is selected to lie above the yield point but below the ultimate fracture point of the section utilized. The cross-section of 4e is also selected so that the applied constant torque shown by weight 23 will lie above the expected peak loading torque of the powerplant but below the torque at which the section is expected to rupture.

The permanent deformation desired when section 4e is "pre-yielded" is slight, the permanent deformation in the foregoing example being only on the order of one degree.

By way of example, the foregoing quill shaft which is designed to operate at a load having momentary peaks of 1700 inch pounds of torque would ordinarily start to yield at 1400 inch pounds. With a top desired failure limit of 2200 inch pounds, this gives a range of 800 inch pounds within which the exact point of failure is uncertain. By pre-yielding the shaft according to Fig. 3, at a constant torque of 1750 inch pounds, which is 50 inch pounds above the expected peak load, the "necked" section 4e will not yield when 1400 inch pounds is again surpassed and cannot be expected to start to yield again until 1750 inch pounds are reached. Actual failure in static loading occurs very close to the value of 2015 inch pounds static load and excellent results have been obtained in repeatedly experiencing failure very close to the value of 2015 inch pounds with numerous specimens. Thus the procedure described significantly reduces the range of expected failures, the design load to be increased without danger of inadvertent failure of the torque-limiting means.

The operation of the improved flexible coupling including the various means for reducing the range of expected torque failure to a very narrow "spread" is outlined as follows. The power input is through quill shaft 4 which is subjected to a given torque determined by the load at the output end of the coupling. Assuming that the shaft 9 is only an intermediate shaft transmitting power between an input shaft and an axially spaced output shaft, there would, of course, be another coupling similar to the one shown in Fig. 1 at the connection between intermediate shaft 9 and the output shaft, this arrangement providing for both angular and radial misalignment of the input and output shafts. The coupling is also useful, however, where the shaft 9 is considered as the output shaft, this latter arrangement providing for angular misalignment of the input shaft with respect to shaft 9.

Torque is thus transmitted through quill shaft 4 and, with all rotating members perfectly coaxial, the "necked" portion 4e is subjected to a pure torsional load. The procedure described for pre-yielding neck 4e after subjecting it to a carefully controlled diameter sizing versus hardness measurement procedure causes the failure torque to lie within a very narrow range of values. With a perfectly aligned coupling, therefore, this quill shaft "pre-yielding" allows the coupling to be designed for a load closely approaching this range of values with the assurance that the quill shaft section 4e will fail at the proper load.

Suppose now that the remotely spaced output shaft becomes radially misaligned with respect to the stationary mounting bracket 1 of the coupling shown in Figs. 1 and 2 thus causing intermediate shaft 9 to become angularly misaligned therewith. Due to the "piloting" means comprised of the centering cylinder 16 and the piloting member 18, the pivot point between the coupling members will lie approximately midway between spline teeth 3c of coupling member 3 and spline teeth 8b of coupling member 8. Stated in another way, the axes of shaft 9 and quill shaft 4 will intersect midway between the spline teeth and the point of intersection will lie at the center of spherical surface 18b. With the piloting means so located, the degree of misalignment which would exist were there a single set of meshing spline teeth will be halved, thus reducing any tendency to increase the torque on the quill shaft shear section 4e due to angular misalignment of the coupling. Thus section 4e will not "see" any additional torque due to shafts 4, 9 no longer lying along the same axis. Since it is not desired to have the section 4e shear merely because the shafts become misaligned, it is not necessary to allow additional strength to the shear section to provide for this contingency.

Another source of extraneous stress which might be introduced into quill shaft 4 is the thrust or axial force exerted along the shaft members. The piloting arrangement shown is axially slidable within the limits permitted by washer 15 and radial wall 16a of centering cylinder 16. As explained previously, when two axially spaced input and output shafts become radially misaligned, there is a lengthening or shortening of the distance between them. Normally, this change in dimension would be communicated to the shafts in the form of an axial load along them. With the arrangement shown, centering member 17 can slide along the inside of centering cylinder 16 while still keeping the pivot point of the coupling substantially midway between teeth 3c, 8b. Within the design limits, very little axial load can be transmitted along quill shaft 4 to combine with the torsion load to provide early inadvertent failure. Thus the axially slidable piloting means midway between meshing spline teeth aids in reducing axial stress communicated along the shafts.

The foregoing combination of features give a flexible coupling with torque-limiting means which may be designed to fail within a very narrow predetermined range of torques. The coupling is especially useful for connecting an input shaft or an output shaft with an intermediate shaft. This allows the input and output shaft to become not only angularly, but also radially, misaligned, the axially slidable piloting means preventing any substantial axially stress from being communicated along the shafts.

The feature of pivoting substantially midway between the meshing spline teeth greatly reduces added stresses in the coupling which would result from misalignment of the spline teeth and the careful sizing of neck portion 4e in accordance with its hardness with the subsequent pre-yielding of neck portion 4e above the expected design load gives rise to a flexible coupling having a torque-limiting shear section whose strength can be accurately predicted.

While there has been described what is at present considered to be the preferred embodiment of the invention, it will be understood that various modifications may be made therein, and it is intended to cover in the appended claims all such modifications as fall within the scope if this invention.

What we claim as new and desire to secure by Letters Patent of the United States is:

1. A flexible coupling for connecting first and second shafts subject to relative angular misalignment comprising first coupling means connected to the first shaft having a first splined radial flange portion and also including a hollow centering cylinder extending axially beyond said first splined portion, second coupling means having a second splined radial flange portion axially spaced from the first splined portion and also including a stub portion extending axially within the centering cylinder and defining a partially spherical surface forming close clearances with the cylinder interior at a point substantially axially midway between the first and second splined portions, a coupling sleeve enclosing said splined flange portions defining spline teeth engaging the first and second coupling splined portions, and torque-limiting means to limit the coupling torque to a predetermined maximum value comprising a reduced diameter shaft portion arranged to be subjected to the torque transmitted by the coupling and torsionally pre-yielded above the normal operating torque transmitted between the first and second shafts.

2. A flexible coupling for connecting first and second shafts subject to relative angular misalignment comprising first rotatably mounted coupling means connected to the first shaft including a reduced diameter shaft portion torsionally pre-yielded above the normal operating torque transmitted between the first and second shafts to limit the load to a predetermined range of torque failure, said first coupling member also including a first splined radial flange portion, second coupling means connected to the second shaft and having a second splined radial flange portion axially spaced from said first splined portion, axially slidable centering means comprising an axially extending hollow centering cylinder and an enclosed stub portion coaxial therewith defining a partially spherical surface forming close clearances with the cylinder interior substantially midway between the first and second splined portions, said centering cylinder being disposed on one of said coupling means and said stub portion being disposed on the other of said coupling means, a coupling sleeve disposed about the first and second flange portions and defining spline teeth engaging the spline teeth of the first and second flange portions, whereby the axially slidable centering means will allow the first and second coupling means to become angularly misaligned and will divide the spline tooth misalignment between the spline teeth of the first and second flange portions while allowing slight axial movement of the second coupling means to reduce the transmission of axial load to the torsionally pre-yielded reduced diameter shaft portion.

3. A flexible coupling for connecting first and second shafts subject to relative angular misalignment comprising quill shaft means having external spline teeth thereon and defining a reduced diameter portion which has been torsionally pre-yielded above the elastic limit of the material comprising the quill shaft means with a constant torque above the normal operating torque transmitted between the first and second shafts, a first coupling member defining internal spline teeth engaging the quill shaft means spline teeth and including a first circumferential radially extending flange portion defining external spline teeth thereon, said first coupling member further including an axially extending hollow cylindrical member having axially spaced inwardly extending radial end walls, a second coupling member connected to the second shaft and including a second circumferential radially extending flange portion defining external spline teeth thereon, said second coupling member further including a stub portion extending axially inside the first coupling hollow cylindrical member, said stub portion having a third radial flange portion of lesser axial length than the cylindrical member end walls and defining a spherical surface forming close clearances with the cylinder interior at a point substantially axially midway between the first and second flange portions, and a coupling sleeve enclosing the first and second flange portions and defining internal spline teeth meshing with the flange spline teeth, whereby the stub portion of the second coupling member will pivot on its spherical surface within the centering cylinder to divide angular misalignment between the first and second flange spline teeth while allowing the second shaft to move axially with respect to the first shaft for preventing axial stress on the quill shaft means.

4. The method of producing a torsional shear member comprising the steps of providing a shaft member having a reduced diameter neck portion, determining the hardness of the neck portion, further reducing the diameter of the neck portion to correspond to a predetermined correlation of diameter versus hardness for the desired rupture torque, applying a torsional load to the shaft with a constant torque exceeding that torque at which the shaft is expected to operate but below that torque at which the shaft is expected to fail, said constant torque also being such as to exceed the yield point of the shaft material so as to cause the neck portion to yield and to undergo permanent deformation.

5. A flexible coupling for connecting first and second shafts subject to relative angular misalignment comprising a first coupling member connected to the first shaft including a first radial flange portion defining external spline teeth thereon and an axially extending hollow cylindrical portion having axially spaced inwardly extending radial end walls, a second coupling member connected to the second shaft including a second radial flange portion defining external spline teeth thereon and axially spaced from and subject to both angular and axial misalignment with respect to said first flange portion, said second coupling member also including a stub portion extending axially within the first coupling member cylindrical portion and defining a third radial flange thereon having a partially spherical surface forming close clearances with the interior of the cylindrical portion at a point substantially axially midway between the first and second flange spline teeth, the axial length of said third flange being less than the axial spacing between the cylindrical portion radial end walls, whereby the first and second coupling members will pivot about the center of the stub spherical surface while allowing limited axial movement of the stub within the extending cylindrical portion to reduce transient axial thrust, and a coupling sleeve defining internal spline teeth meshing with the first and second flange spline teeth to transmit torque between the first and second coupling members, whereby the angular misalignment between the coupling members is divided between the two sets of spline teeth to reduce coupling torsional stress due to tooth misalignment.

References Cited in the file of this patent
UNITED STATES PATENTS

| | | |
|---|---|---|
| 2,565,558 | Highberg | Aug. 28, 1951 |
| 2,712,740 | Boyd | July 12, 1955 |
| 2,778,565 | Atkinson | Jan. 22, 1957 |
| 2,924,954 | Panhard | Feb. 16, 1960 |